(12) United States Patent
Byun

(10) Patent No.: US 10,936,508 B2
(45) Date of Patent: Mar. 2, 2021

(54) STORAGE DEVICE AND METHOD OF OPERATING THE SAME

(71) Applicant: SK hynix Inc., Icheon-si (KR)

(72) Inventor: Eu Joon Byun, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/569,536

(22) Filed: Sep. 12, 2019

(65) Prior Publication Data
US 2020/0226070 A1 Jul. 16, 2020

(30) Foreign Application Priority Data

Jan. 15, 2019 (KR) ........................ 10-2019-0005353

(51) Int. Cl.
*G06F 12/1009* (2016.01)
(52) U.S. Cl.
CPC .. *G06F 12/1009* (2013.01); *G06F 2212/1044* (2013.01); *G06F 2212/657* (2013.01)
(58) Field of Classification Search
CPC .. G06F 12/1009; G06F 12/10; G06F 12/0246; G06F 2212/1044; G06F 2212/7201; G06F 2212/72
See application file for complete search history.

(56) References Cited

U.S. PATENT DOCUMENTS

| 2019/0087325 A1* | 3/2019 | Sakurai | G06F 3/0679 |
| 2019/0108131 A1* | 4/2019 | Lee | G06F 3/0679 |
| 2019/0121540 A1* | 4/2019 | Shin | G06F 13/126 |
| 2019/0146709 A1* | 5/2019 | Im | G06F 3/0622 711/103 |
| 2019/0235762 A1* | 8/2019 | Kaburaki | G06F 12/0864 |
| 2019/0266079 A1* | 8/2019 | R | G06F 3/064 |

(Continued)

FOREIGN PATENT DOCUMENTS

| KR | 10-0963140 | 6/2010 |
| KR | 10-2014-0057454 | 5/2014 |

(Continued)

OTHER PUBLICATIONS

Jeong, W. et al., Improving Flash Storage Performance by Caching Address Mapping Table in Host Memory, Proceedings of the 9th USENIX Conference on Hot Topics in Storage and File Systems, USENIX Association Berkeley, Jul. 10, 2017.

*Primary Examiner* — Tracy A Warren
(74) *Attorney, Agent, or Firm* — Perkins Coie LLP

(57) ABSTRACT

A memory controller may include: a map data processor configured to receive original map data segments from a memory device and generate a mode signal; an original map data storage configured to sequentially store the original map data segments in source storage areas corresponding to source addresses; a converted map data storage configured to store the original map data segments in target storage areas corresponding to target addresses; and a map data converter configured to control the converted map data storage such that, when any one original map data segment is stored in a first target storage area corresponding to a first target address, an original map data segment subsequent to the any one original map data segment is stored in a second target storage area corresponding to a second target address obtained by adding a predetermined offset to the first target address.

20 Claims, 13 Drawing Sheets

(56) References Cited

U.S. PATENT DOCUMENTS

2019/0303283 A1* 10/2019 McGlaughlin ....... G11C 16/349
2019/0303299 A1* 10/2019 Su ........................ G06F 3/0656

FOREIGN PATENT DOCUMENTS

| KR | 10-1400506 | 5/2014 |
| KR | 10-2015-0132151 | 11/2015 |
| KR | 10-2017-0031389 | 3/2017 |
| KR | 10-1798036 | 11/2017 |

* cited by examiner

MAP DATA CONVERSION IN
RESPONSE TO FIRST MODE SIGNAL

MAP DATA CONVERSION IN RESPONSE TO SECOND MODE SIGNAL

STORAGE DEVICE AND METHOD OF OPERATING THE SAME

CROSS-REFERENCE TO RELATED APPLICATION

This patent document claims priority to Korean patent application number 10-2019-0005353 filed on Jan. 15, 2019, which is incorporated herein by reference in its entirety for all purposes.

TECHNICAL FIELD

Various embodiments of the disclosed technology generally relate to an electronic device, and more particularly, to a storage device and a method of operating the storage device.

BACKGROUND

Storage devices are refer to electronic components that are used to store data on a permanent or temporary basis. Each storage device may include one or more a storage medium to store data, and may further include a memory controller configured to control the memory device to store or retrieve data. The storage device can be classified based on the type of storage medium. For example, a hard disk drive (HDD) uses a magnetic disk as the storage medium, and a solid-state drive (SSD) or a memory card uses, as the storage medium, semiconductor memory devices such as volatile memory devices and nonvolatile memory devices.

A volatile memory device is a memory device that can retain its data only when power is supplied thereto. Thus, such a volatile memory device loses its data in the absence of power. Examples of the volatile memory device include a static random access memory (SRAM), and a dynamic random access memory (DRAM).

On the other hand, a nonvolatile memory device is a memory device that can retain data stored therein even in the absence of power. Examples of the nonvolatile memory device include a read-only memory (ROM), a programmable ROM (PROM), an electrically programmable ROM (EPROM), an electrically erasable programmable ROM (EEPROM), and a flash memory.

SUMMARY

Various embodiments of the disclosed technology relate to a storage device configured to perform a map data conversion operation, and a method of operating the storage device.

An embodiment of the disclosed technology may provide for a memory controller including: a map data processor configured to receive original map data segments from a memory device and generate a mode signal; an original map data storage in communication with the map data processor and configured to sequentially store the original map data segments in source storage areas that respectively correspond to a plurality of source addresses; a converted map data storage in communication with the map data processor and configured to store the original map data segments in target storage areas that respectively correspond to a plurality of target addresses; and a map data converter configured to control the converted map data storage such that, in response to the mode signal, when any one original map data segment of the original map data segments that are sequentially stored in the source storage areas is stored in a first target storage area corresponding to a first target address of the plurality of target addresses, an original map data segment subsequent to the any one original map data segment is stored in a second target storage area that corresponds to a second target address obtained by adding a predetermined offset to the first target address.

An embodiment of the disclosed technology may provide for a memory controller including: a map data processor configured to receive an original map data segment from a memory device, and generate a mode signal for requesting to generate a converted map data segment obtained by converting the original map data segment; an original map data storage in communication with the map data processor and configured to store the original map data segment having a first data size; a converted map data storage in communication with the map data processor and configured to store the converted map data segment having a second data size different from the first data size; and a map data converter in communication with the map data processor and configured to control the converted map data storage to store a part of the original map data segment as the converted map data segment in response to the mode signal.

An embodiment of the disclosed technology may provide for a storage device including: a memory device configured to store a logical-physical mapping table indicating a mapping relationship between a logical address of data provided from a host and a physical address of the memory device in which the data is stored; and a memory controller configured to receive original map data segments included in the logical-physical mapping table from the memory device, generate a mode signal for requesting to generate converted map data segments obtained by converting the original map data segments, sequentially store, in response to the mode signal, the original map data segments in source storage areas that respectively correspond to a plurality of source addresses, and store, when a selected original map data segment of the original map data segments is stored in a target storage area corresponding to a first target address of a plurality of target addresses, an original map data segment subsequent to the selected original map data segment in a target storage area corresponding to a second target address obtained by adding a predetermined offset to the first target address among the plurality of target addresses. The plurality of source addresses may increase at an offset interval different from an interval of the predetermined offset.

An embodiment of the disclosed technology may provide for a storage device including: a memory device configured to store a logical-physical mapping table indicating a mapping relationship between a logical address of data provided from a host and a physical address of the memory device in which the data is stored; and a memory controller configured to receive an original map data segment included in the logical-physical mapping table from the memory device, generate a mode signal for requesting to generate a converted map data segment obtained by converting the original map data segment, store a part of the original map data segment as the converted map segment in response the mode signal, the original map data segment having a first data size, and the converted map data segment having a second data size different from the first data size.

An embodiment of the disclosed technology may provide for a storage device including a memory device including a map cache to store cache segments for logical-to-physical mapping, a memory mapping circuit configured to translate cache segments from one format to another format, and a memory interface configured to access the memory device based on the translated cache segments. The translation of the cache segments by the memory mapping circuit includes adding additional information to the cache segment of the one format to match the other format. The translation of the cache segments by the memory mapping circuit includes skipping a predetermined number of bytes of data segments such that a sum of the predetermined number of bytes of data segments and a number of bytes of the data segment of the one format matches a number of bytes of the data segment of the other format.

DETAILED DESCRIPTION

The technology disclosed in this patent document can be implemented in embodiments to provide a storage device that can perform a mapping information conversion to convert mapping formats.

Figure 1:
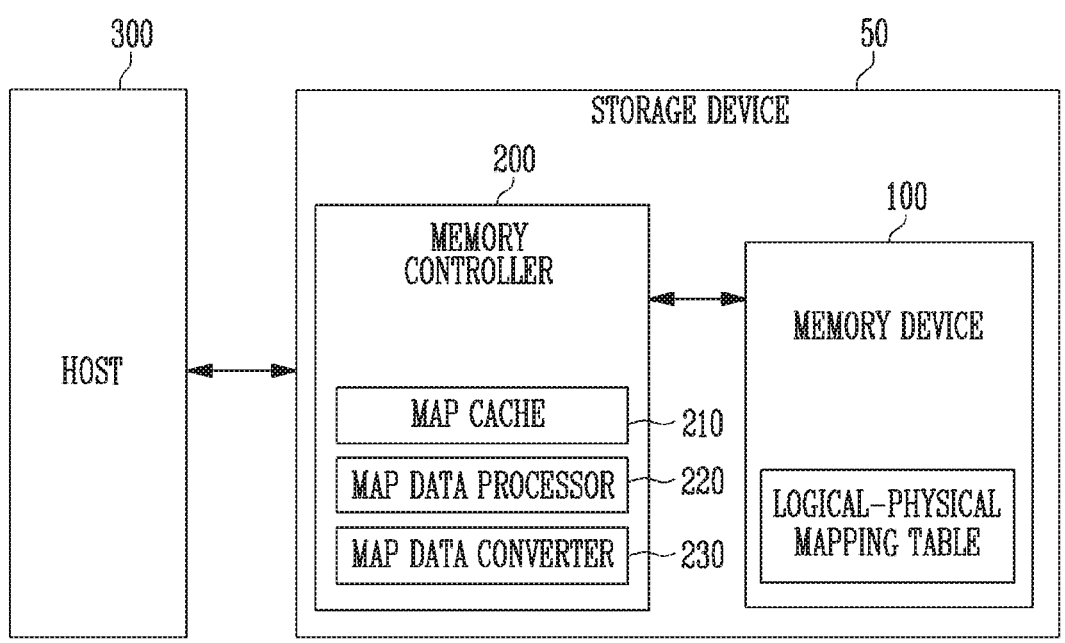
FIG. 1 is a diagram illustrating an example of a storage device based on an embodiment of the disclosed technology.

FIG. 1 is a diagram illustrating a storage device 50 based on an embodiment of the disclosed technology.

Referring to FIG. 1, the storage device 50 may include a memory device 100, and a memory controller 200 configured to control the operation of the memory device 100. The storage device 50 is used to store and retrieve according to requests from a host 300 such as a cellular phone, a smartphone, an MP3 player, a laptop computer, a desktop computer, a game machine, a TV, a tablet PC, or an in-vehicle infotainment system.

The storage device 50 may be manufactured as any one of various kinds of storage devices depending on a host interface, which is a communication interface between the host 300 and the storage device 50. For example, the data storage device 50 may be configured of any one of various kinds of storage devices such as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, and a memory stick.

The storage device 50 may be manufactured in the form of any one of various package types. For instance, the storage device 50 may be manufactured in the form of any one of various package types such as a package on package (POP) type, a system in package (SIP) type, a system on chip (SOC) type, a multi-chip package (MCP) type, a chip on board (COB) type, a wafer-level fabricated package (WFP) type, and a wafer-level stack package (WSP) type.

The memory device 100 may be a storage space where data to be processed and/or instructions to be executed are stored. The memory device 100 may include the logic needed to read and write to the memory device 100. The memory device 100 may include a memory cell array including a plurality of memory cells configured to store data therein.

The memory cells can be made capable of storing more than a single bit of information. For example, a single level cell (SLC) stores a single data bit per cell, a multi-level cell (MLC) stores two data bits per cell, a triple-level cell (TLC) stores three data bits per cell, and a quad-level cell (QLC) stores four data bits per cell.

The memory cell array may include a plurality of memory blocks. Each memory block may include a plurality of pages, and each pages corresponds to a plurality of memory cells. In an embodiment of the disclosed technology, read and program (write) operations are performed on a page basis, and erase operations are performed on a block basis.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), or a spin transfer torque random access memory (STT-RAM). In this patent document, for the sake of explanation, it is assumed that the memory device 100 is a NAND flash memory.

The memory controller 200 can access the memory device 100 based on requests from the user/host by providing command/address signals to the memory controller 200. In other words, the memory device 100 may perform an operation corresponding to the command on the area selected by the address. For example, the memory device 100 may perform a write (program) operation, a read operation, and an erase operation according to the task requested by the user/host. During a program operation, memory controller 200 may write data to a memory cell area of the memory device 100 selected by an address. During a read operation, the memory controller 200 may read data from an area of the memory device 100 selected by an address. During an erase operation, the memory controller 200 may erase data from an area of the memory device 100 selected by an address.

In an embodiment, the memory device 100 may store a logical-physical mapping table in a memory block included in the memory cell array. In another embodiment, the logical-physical mapping table may be retained in a data storage outside the memory device 100. The logical-physical mapping table may include mapping information that can be used to map logical addresses to physical addresses of the memory device 100 in which the data is physically stored. Original map data included in the logical-physical mapping table may be divided into a plurality of original map data segments.

In an embodiment, each of the original map data segments may include physical address information indicating a physical address corresponding to a logical address of data provided from the host 300. In an embodiment, each of the original map data segments may further include additional information pertaining to the physical address information.

The memory controller 200 may control overall operations of the storage device 50.

When power is applied to the storage device 50, the memory controller 200 may execute certain computer program instructions which may be in form of firmware. In the case where the memory device 100 is a flash memory device, the memory controller 200 may execute firmware such as a flash translation layer (FTL) for controlling communication between the host 300 and the memory device 100. In an implementation, a flash translation layer (FTL) may be situated in the memory controller 200 to implement logical-to-physical mapping, garbage collection, wear leveling management, and bad block management. For example, the FTL may provide an interface between a host interface layer and a flash interface layer.

In an embodiment, upon receipt of data and a corresponding logical block address (LBA) from the host 300, the memory controller 200 may translate the LBA into a physical block address (PBA) indicating where the memory cells to write data to or read data from are in the memory device 100.

The memory controller 200 may control the memory device 100 to perform a program operation, a read operation, or an erase operation based on a request from the host 300. During the program operation, the memory controller 200 may provide a program command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may autonomously generate a program command, an address and data regardless of a request from the host 300, and transmit them to the memory device 100. For example, the memory controller 200 may provide a command, an address and data to the memory device 100 to perform background operations such as a program operation for wear leveling, and a program operation for garbage collection.

In an embodiment, the memory controller 200 may control more than one memory device 100 at the same time. In this case, the memory controller 200 may control the memory devices 100 in an interleaving manner to enhance the operating performance. The interleaving scheme may improve system performance by performing more than one operation at a given time frame. For example, the interleaving scheme may perform operations on two or more memory devices 100 at the same time by interleaving a part of a queue associated with a memory device with a part of another queue associated with another memory device.

In an embodiment, the memory controller 200 may include a map cache 210, a map data processor 220, and a map data converter 230.

In an implementation, the memory controller 200 may use its own memory as a cache for mapping table (e.g., L2P mapping table, FTL mapping table). In another implementations, the memory controller 200 may use a separate memory as a cache for mapping table. In an embodiment of the disclosed technology, the map cache 210 may store mapping information. For example, the map cache 210 may store a part of mapping information included in the logical-physical mapping table stored in the memory device 100. Map data stored in the map cache 210 may be used when access to data stored in the memory device 100 is required. The map data processor 220 may receive, from the memory device 100, original map data including a plurality of original map data chunks or segments. In an embodiment, each of the original map data segments may include a logical-physical mapping table such as a mapping table for logical to physical (L2P) mapping that maps a logical address provided from the host 300 to a corresponding physical address. In an embodiment, each of the original map data segments may further include additional information pertaining to the physical address information.

The map data processor 220 may receive a map data request from the host 300. The map data processor 220 may generate a first mode signal in response to the map data request. In some embodiments of the disclosed technology, the map data processor 220 may generate the first mode signal when a background operation is performed. In some other embodiments of the disclosed technology, the map data processor 220 may generate the first mode signal based on a map data management policy regardless of a request of the host.

In an embodiment of the disclosed technology, the map data processor 220 may provide the original map data and the first mode signal to the map data converter 230. The first mode signal may be a request message for generating first converted map data using the original map data.

In various implementations, the first converted map data may include first converted map data segments, which are obtained by converting the original map data segments included in the original map data in response to the first mode signal. Here, each of the original map data segments may include physical address information. The first converted map data segment may include both the physical address information included in each original map data segment and the additional information pertaining to the physical address information.

The map data processor 220 may provide, to the host 300, the first converted map data obtained from the map data converter 230.

In an embodiment of the disclosed technology, the map data processor 220 may generate a second mode signal when mapping information included in the logical-physical mapping table stored in the memory device 100 is updated. Here, the mapping information may correspond to mapping information stored in the map cache 210. The map data processor 220 may provide the original map data and the second mode signal to the map data converter 230. The second mode signal may be a signal for requesting to generate second converted map data using the original map data.

The second converted map data may include second converted map data segments that are obtained by converting the original map data segments included in the original map data in response to the second mode signal. Here, each of the original map data segments may include physical address information and additional information pertaining to the physical address information. The second converted map data segment is a part of the corresponding original map data segment, and may include physical address information included in the original map data segment. The second converted map data segment may not include additional information pertaining to the physical address information included in the original map data segment.

The map data processor 220 may update the map cache 210 using the second converted map data obtained from the map data converter 230. In an implementation, the memory controller 200 may add the second converted map data to the map cache 210, or in another implementation, the memory controller 200 may convert the mapping information stored in the map cache 210 into second converted map data.

The map data converter 230 may receive the original map data and a mode signal from the map data processor 220. The mode signal may include a first mode signal or a second mode signal. The map data converter 230 may generate converted map data, which include a plurality of converted map data segments, using the original map data in response to the mode signal.

The original map data that is received along with the first mode signal may differ from the original map data that is received along with the second mode signal. For example, the original map data that is received along with the first mode signal when the first mode signal is received may include only physical address information. The original map data that is received along with the second mode signal may include the physical address information and additional information pertaining to the physical address information.

In an embodiment of the disclosed technology, the map data converter 230 may generate first converted map data, which include a plurality of first converted map data segments, using the received original map data segments in response to the first mode signal provided from the map data processor 220. The map data converter 230 may provide the generated first converted map data to the map data processor 220.

In an embodiment of the disclosed technology, the map data converter 230 may generate second converted map data, which include a plurality of second converted map data segments, using the received original map data segments in response to the second mode signal provided from the map data processor 220. The map data converter 230 may provide the generated second converted map data to the map data processor 220.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

In an embodiment, the host 300 may provide a map data request to the memory controller 200. The host 300 may store, in a host memory, first converted map data obtained in response to the map data request. The host 300 may provide, to the memory controller 200, a logical address of the data, along with a read request for data stored in the memory device 100. When providing the logical address to the memory controller 200, the host 300 may provide the first converted map data stored in the host memory, along with the logical address, to the memory controller 200. The memory controller 200 may control the memory device to read data corresponding to the read request using physical address information included in the first converted map data received from the host 300.

Figure 2:
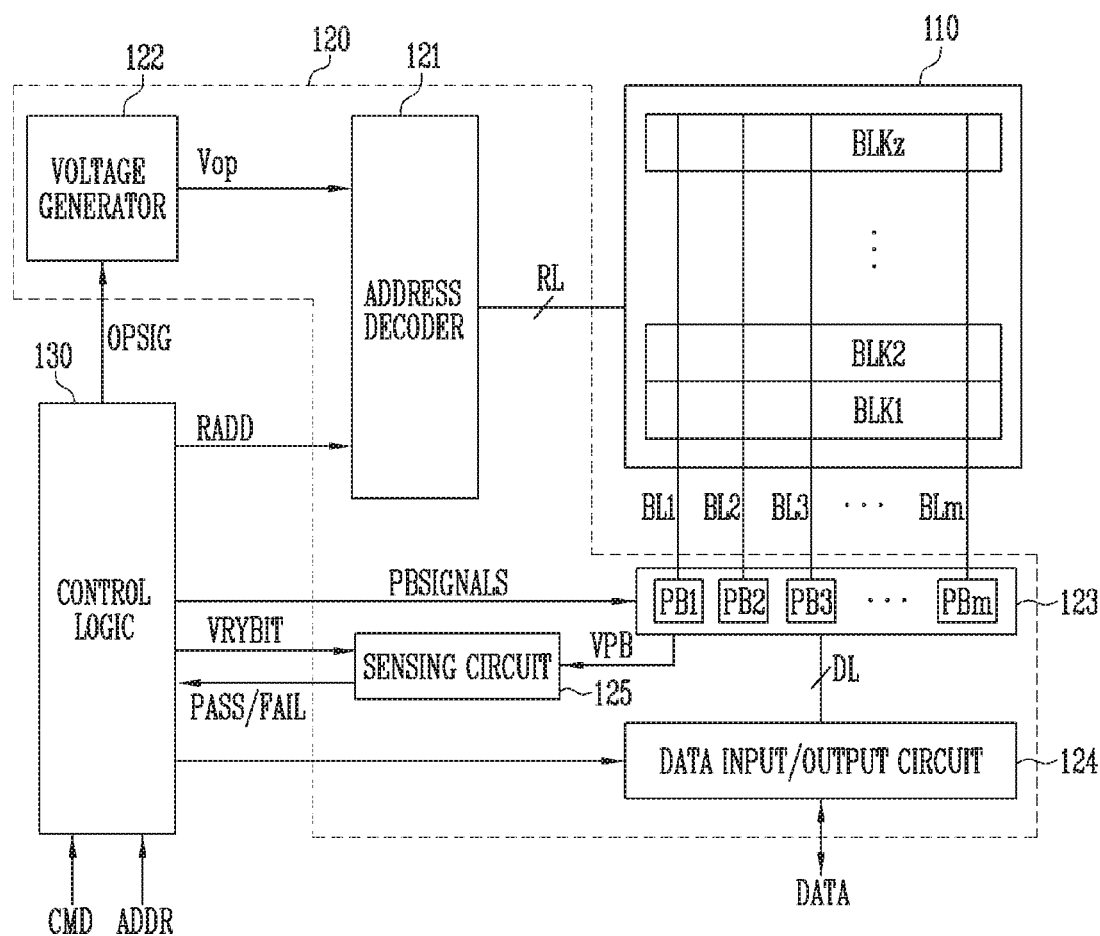
FIG. 2 is a diagram illustrating an example configuration of a memory device of FIG. 1.

FIG. 2 is a diagram illustrating an example configuration of the memory device 100 of FIG. 1.

Referring to FIG. 2, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz are coupled to an address decoder 121 through row lines RL. The memory blocks BLK1 to BLKz may be coupled to the read/write circuit 123 through bit lines BL1 to BLm. Each of the memory blocks BLK1 to BLKz may include a plurality of memory cells. In an embodiment of the disclosed technology, the plurality of memory cells may be nonvolatile memory cells. Memory cells coupled to the same word line among the plurality of memory cells are defined as one page. In other words, the memory cell array 110 may be formed of a plurality of pages. In an embodiment, each of the memory blocks BLK1 to BLKz included in the memory cell array 110 may include a plurality of dummy cells which are structured like memory cells but are used for purposes other than storing data. For example, one or more dummy cells may be coupled in series between a drain select transistor and memory cells and between a source select transistor and the memory cells to reduce unwanted interference between the drain/source select transistors and the memory cells.

In an embodiment of the disclosed technology, the logical-physical mapping table may be stored in a memory block included in the memory cell array 110. The logical-physical mapping table may include mapping information that can be used to map one address to another address between logical addresses of data provided from the host described with reference to FIG. 1 and physical addresses of the memory device 100 in which respective pieces of data are stored. Original map data stored in the logical-physical mapping table may be divided into a plurality of original map data segments.

In an embodiment, each of the original map data segments may include physical address information indicating a physical address corresponding to a logical address of data. In an embodiment, each of the original map data segments may include the physical address information and additional information pertaining to the physical address information.

The additional information may be used to determine whether the physical address information is valid. The additional information may also be used to indicate the frequency of access to the physical address information. The additional information may also include information related to generation of the physical address information. Whether the physical address information is valid may be determined based on whether the physical address information is the most recently updated information. The information related to generation of the physical address information may include a sequence in which the physical address information is generated.

Each of the memory cells of the memory device 100 may be a single level cell (SLC), which stores a single data bit, a multi-level cell (MLC), which stores two data bits, a triple-level cell (TLC), which stores three data bits, or a quad-level cell (QLC), which stores four data bits.

The peripheral circuit 120 may include an address decoder 121, a voltage generator 122, a read/write circuit 123, a data input/output circuit 124, and a sensing circuit 125.

The peripheral circuit 120 may be used for I/O functions, power distribution, address decoding, etc. For example, the peripheral circuit 120 may drive word lines and bit lines to perform a program operation, a read operation, or an erase operation on the memory cell array 110.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The control logic 130 controls the operations of the peripheral circuit 120. The control logic 130 controls the operations of the address decoder 121 by generating row addresses and column addresses based on addresses ADDR.

The address decoder 121 may decode the addresses ADDR to obtain a block address. The address decoder 121 may select at least one of the memory blocks BLK1 to BLKz according to the decoded block address. The address decoder 121 may decode the addresses ADDR to obtain a row address RADD. The address decoder 121 may select at least one word line WL of the selected memory block by applying voltages supplied from the voltage generator 122 to at least one word line WL according to the decoded row address RADD.

During a program operation, the address decoder 121 may apply a program voltage to a selected word line and apply a pass voltage having a level lower than that of the program voltage to unselected word lines. During a program verify operation, the address decoder 121 may apply a verify voltage to a selected word line and apply a verify pass voltage having a level higher than that of the verify voltage to unselected word lines.

During a read operation, the address decoder 121 may apply a read voltage to a selected word line and apply a read pass voltage having a level higher than that of the read voltage to unselected word lines.

In an embodiment, an erase operation of the memory device 100 may be performed on a memory block basis. During the erase operation, an address ADDR to be input to the memory device 100 includes a block address. The address decoder 121 may decode the block address and select a corresponding memory block according to the decoded block address. During the erase operation, the address decoder 121 may apply a ground voltage to word lines coupled to the selected memory block.

In an embodiment of the disclosed technology, the address decoder 121 may decode a column address among the transmitted addresses ADDR. The decoded column address may be transmitted to the read/write circuit 123. For example, the address decoder 121 may include components such as a row decoder, a column decoder, and an address buffer.

The voltage generator 122 may generate a plurality of operating voltages Vop using an external supply voltage supplied to the memory device 100. The control logic 130 controls the operations of the voltage generator 122.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of operating voltages Vop using an external supply voltage or an internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors configured to receive an internal supply voltage. The voltage generator 122 may generate a plurality of operating voltages Vop by selectively enabling the plurality of pumping capacitors.

The generated operating voltages Vop may be supplied to the memory cell array 110 by the address decoder 121.

The read/write circuit 123 may include first to m-th page buffers PB1 to PBm. The first to m-th page buffers PB1 to PBm may be coupled to the memory cell array 110 through the first to m-th bit lines BL1 to BLm, respectively. The first to m-th page buffers PB1 to PBm may operate under control of the control logic 130.

The first to m-th page buffers PB1 to PBm may communicate data DATA with the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transmit the data DATA, received through the data input/output circuit 124, to selected memory cells through the bit lines BL1 to BLm when a program pulse is applied to a selected word line. The memory cells in the selected page are programmed based on the transmitted data DATA. Memory cells coupled to a bit line to which a program enable voltage (e.g. a ground voltage) is applied may have increased threshold voltages. Threshold voltages of memory cells coupled to a bit line to which a program inhibit voltage (for example, a supply voltage) is applied may be retained. During a program verify operation, the first to m-th page buffers PB1 to PBm may read data DATA from selected memory cells through the bit lines BL1 to BLm.

During a read operation, the read/write circuit 123 may read data DATA from the memory cells of the selected page through the bit lines BL, and store the read data DATA to the first to m-th page buffers PB1 to PBm.

During an erase operation, the read/write circuit 123 may float the bit lines BL. In an embodiment, the read/write circuit 123 may include a column select circuit.

In an embodiment, while data stored in some page buffers of the plurality of page buffers included in the read/write circuit 123 is programmed to the memory cell array 110, the other page buffers may receive new data from the memory controller 200 and store the new data.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) for receiving inputted data DATA. During a program operation, the data input/output circuit 124 may receive data DATA to be stored from an external controller (not shown). During a read operation, the data input/output circuit 124 may output, to the external controller, the data DATA received from the first to m-th page buffers PB1 to PBm included in the read/write circuit 123.

During a read operation or a verify operation, the sensing circuit 125 may generate reference current in response to an enable bit signal VRYBIT generated by the control logic 130, compare a sensing voltage VPB received from the read/write circuit 123 with a reference voltage generated by the reference current, and output a pass signal or a fail signal to the control logic 130.

The control logic 130 may be coupled to the address decoder 121, the voltage generator 122, the read/write circuit 123, the data input/output circuit 124, and the sensing circuit 125. The control logic 130 may control the overall operation of the memory device 100. The control logic 130 may operate in response to a command CMD transmitted from an external device.

The control circuit 130 may generate various signals in response to the command CMD and the address ADD and control the peripheral circuit 120. For example, the control logic 130 may generate an operating signal OPSIG, a row address RADD, a read/write circuit control signal PB SIGNALS, and an enable bit VRYBIT in response to the command CMD and the address ADD. The control logic 130 may output the operating signal OPSIG to the voltage generator 122, output the row address RADD to the address decoder 121, output the read/write control signal to the read/write circuit 123, and output the enable bit VRYBIT to the sensing circuit 125. Furthermore, the control logic 130 may determine whether target memory cells have passed or failed a verification during the verify operation in response to a pass signal PASS or a fail signal FAIL that is output from the sensing circuit 125.

Figure 3:
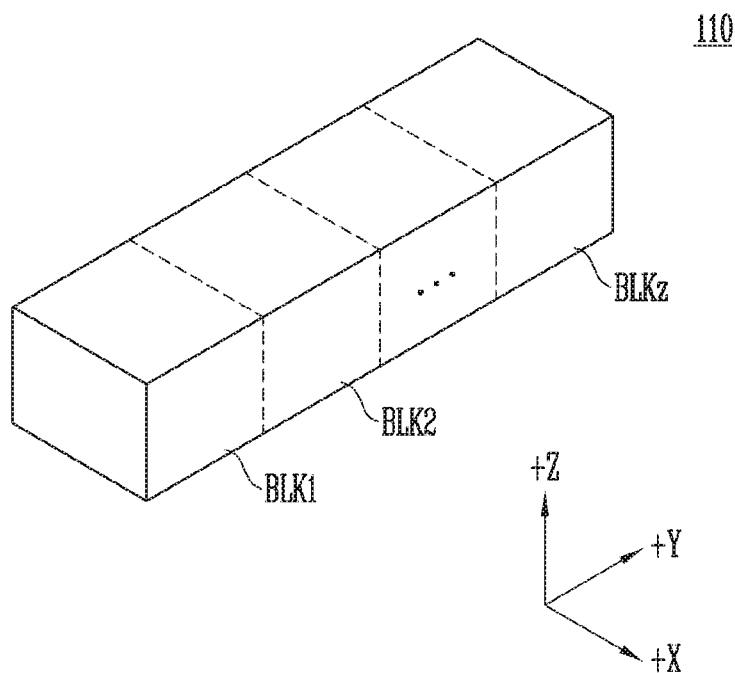
FIG. 3 is a diagram illustrating an example of a memory cell array of FIG. 2 based on an embodiment of the disclosed technology.

FIG. 3 is a diagram illustrating an example of the memory cell array 110 of FIG. 2 based on an embodiment of the disclosed technology.

Referring to FIG. 3, the memory cell array 110 may include a plurality of memory blocks BLK1 to BLKz. Each memory block has a three-dimensional structure. Each memory block may include a plurality of memory cells stacked on a substrate. The memory cells are arranged in a +X direction, a +Y direction, and a +Z direction. The structure of each memory block will be described in more detail with reference to FIGS. 4 and 5.

Figure 4:
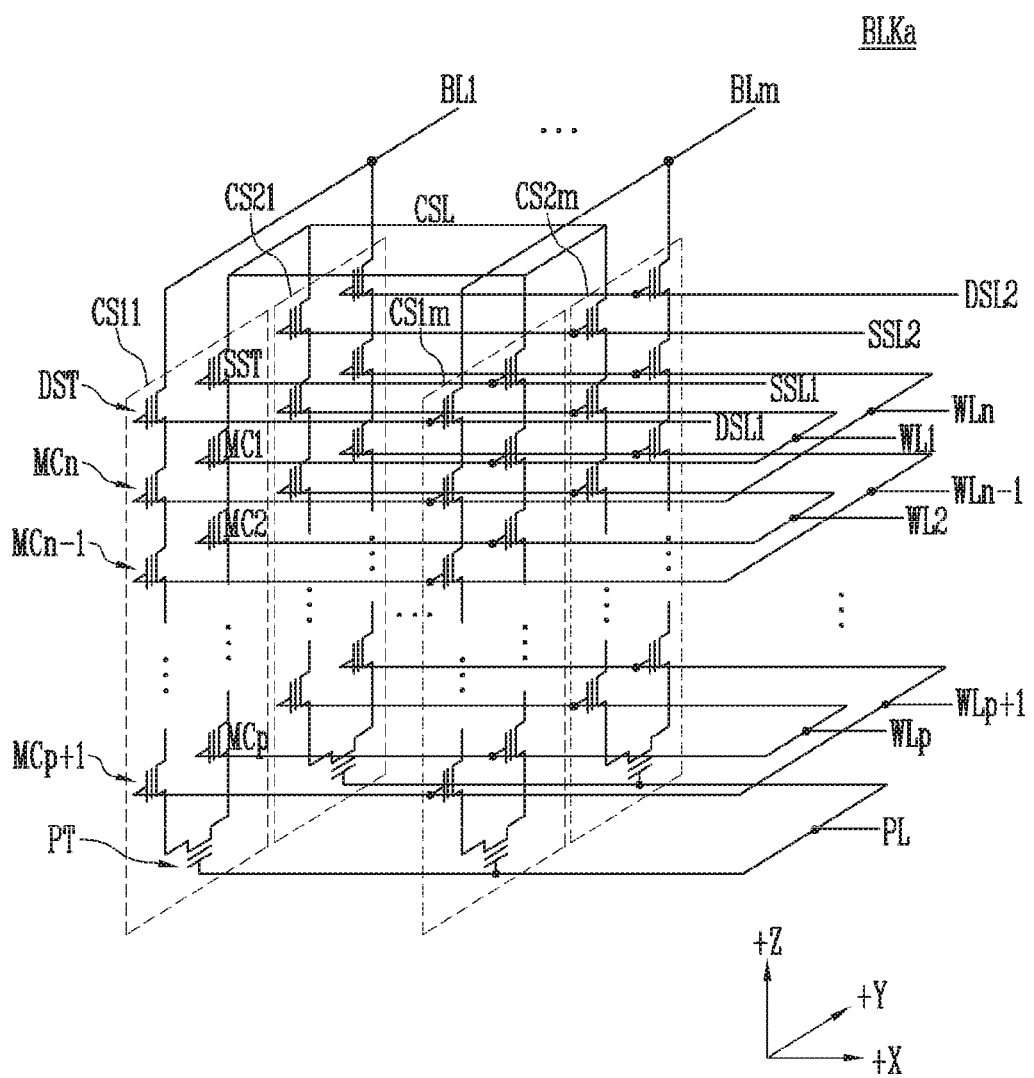
FIG. 4 is a circuit diagram illustrating any one memory block BLKa of memory blocks BLK1 to BLKz of FIG. 3, based on an embodiment of the disclosed technology.

FIG. 4 is a circuit diagram illustrating any one memory block BLKa of memory blocks BLK1 to BLKz of FIG. 3, based on an embodiment of the disclosed technology.

Figure 5:
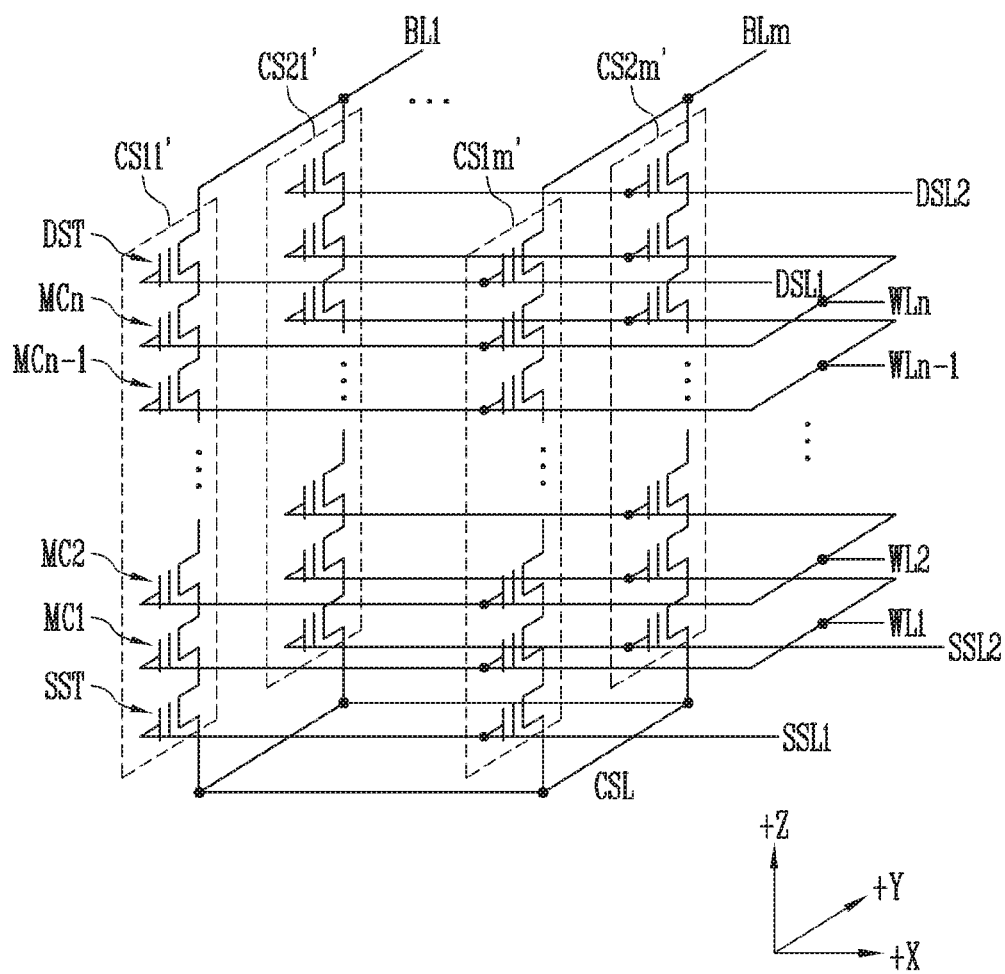
FIG. 5 is a circuit diagram illustrating any one memory block BLKb of the memory blocks BLK1 to BLKz of FIG. 3, based on an embodiment of the disclosed technology.

Referring to FIG. 4, the memory block BLKa may include a plurality of cell strings CS11 to CS1m and CS21 to CS2m. In an embodiment, each of the cell strings CS11 to CS1m and CS21 to CS2m may be formed in a 'U' shape. In the memory block BLKa, m cell strings may be arranged in a row direction (i.e., the +X direction). In FIG. 5, two cell strings are illustrated as being arranged in a column direction (i.e., the +Y direction). However, this illustration is made only for convenience of description, and it will be understood that three or more cell strings may be arranged in the column direction.

Each of the plurality of cell strings CS11 to CS1m and CS21 to CS2m may include at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 4, source select transistors of the cell strings CS11 to CS1m in a first row are coupled to a first source select line SSL1. Source select transistors of the cell strings CS21 to CS2m in a second row are coupled to a second source select line SSL2.

In an embodiment, the source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are successively arranged in a direction opposite to the +Z direction and are coupled in series between the source select transistor SST and the pipe transistor PT. The p+1-th to n-th memory cells MCp+1 to MCn are successively arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

Respective gates of the pipe transistors PT of the cell strings are coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1m in the first row are coupled to a first drain select line DSL1. Drain select transistors of the cell strings CS21 to CS2m in the second row are coupled to a second drain select line DSL2.

Cell strings arranged in the column direction may be coupled to bit lines extending in the column direction. In FIG. 4, cell strings CS11 and CS21 in a first column are coupled to a first bit line BL1. Cell strings CS1m and CS2m in an m-th column are coupled to an m-th bit line BLm.

Memory cells coupled to the same word line in cell strings arranged in the row direction form a single page. For example, memory cells coupled to the first word line WL1, among the cell strings CS11 to CS1m in the first row, form a single page. Memory cells coupled to the first word line WL1, among the cell strings CS21 to CS2m in the second row, form another single page. When any one of the drain select lines DSL1 and DSL2 is selected, corresponding cell strings arranged in the direction of a single row may be selected. When any one of the word lines WL1 to WLn is selected, a corresponding single page may be selected from among the selected cell strings.

In an embodiment, even numbered bit lines and odd numbered bit lines may be provided in lieu of the first to m-th bit lines BL1 to BLm. Even-numbered cell strings of the cell strings CS11 to CS1m or CS21 to CS2m arranged in the row direction may be coupled to the respective even-numbered bit lines. Odd-numbered cell strings of the cell strings CS11 to CS1m or CS21 to CS2m arranged in the row direction may be coupled to the respective odd numbered bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCp. Alternatively, at least one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the at least one or more dummy memory cells, each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

FIG. 5 is a circuit diagram illustrating any one memory block BLKb of the memory blocks BLK1 to BLKz of FIG. 3, based on an embodiment of the disclosed technology.

Referring to FIG. 5, the memory block BLKb may include a plurality of cell strings CS11' to CS1m' and CS21' to CS2m'. Each of the cell strings CS11' to CS1m' and CS21' to CS2m' extends in the +Z direction. Each of the cell strings CS11' to CS1m' and CS21' to CS2m' may include at least one source select transistor SST, first to n-th memory cells MC1 to MCn, and at least one drain select transistor DST which are stacked on a substrate (not shown) provided in a lower portion of the memory block BLK1'.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1m' arranged in a first row may be coupled to a first source select line SSL1. Source select transistors of the cell strings CS21' to CS2m' arranged in a second row may be coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequentially, the memory block BLKb of FIG. 5 may have an equivalent circuit similar to that of the memory block BLKa of FIG. 4 except that a pipe transistor PT is excluded from each cell string.

In an embodiment, even numbered bit lines and odd numbered bit lines may be provided in lieu of the first to m-th bit lines BL1 to BLm. Even-numbered cell strings among the cell strings CS11' to CS1m' or CS21' to CS2m' arranged in the row direction may be coupled to the respective even-numbered bit lines, and odd-numbered cell strings among the cell strings CS11' to CS1m' or CS21' to CS2m' arranged in the row direction may be coupled to the respective odd-numbered bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCn. Alternatively, at least one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the at least one or more dummy memory cells, each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 6A:
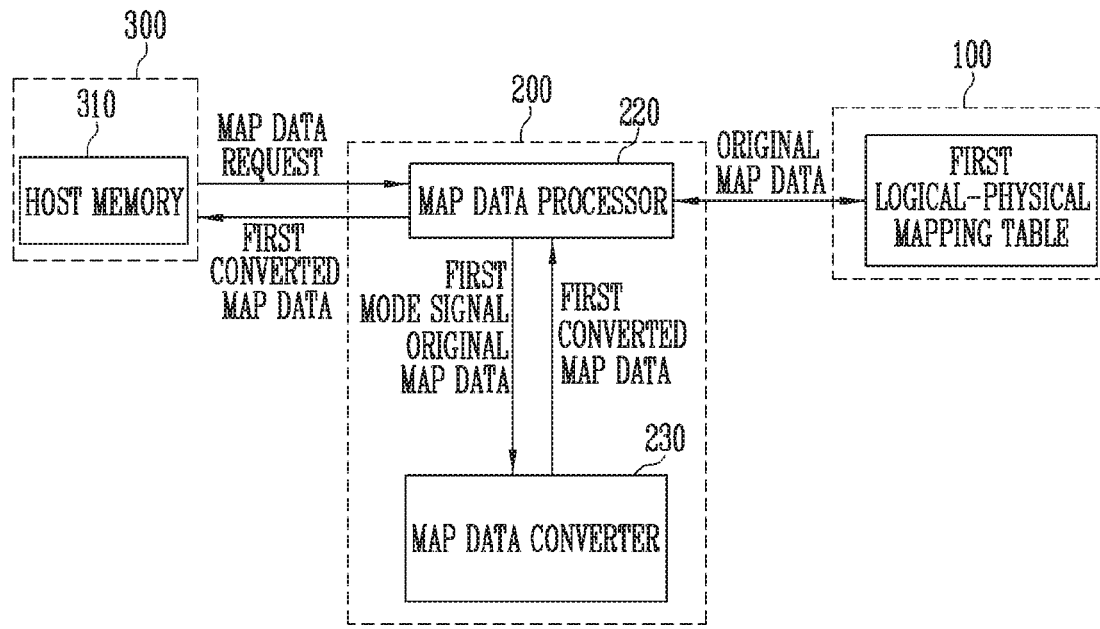
FIG. 6A illustrates an example operation of a memory controller based on an embodiment of the disclosed technology.

FIG. 6A illustrates an example operation of the memory controller 200 based on an embodiment of the disclosed technology.

Referring to FIG. 6A, the memory device 100 may include a first logical-physical mapping table.

The first logical-physical mapping table may be retained in memory device. For example, the first logical-physical mapping table may be stored in a memory block of the memory cell array described with reference to FIG. 2. The first logical-physical mapping table may include mapping information that can be used to map logical addresses, which is provided by the host 300, to physical addresses of the memory device 100 in which the data is physically stored. Original map data included in the first logical-physical mapping table may be divided into a plurality of original map data segments. Each of the original map data segments may include physical address information indicating a physical address corresponding to a logical address of data.

Referring to FIG. 6A, the memory controller 200 may include a map data processor 220 and a map data converter 230.

The map data processor 220 may receive, from the memory device 100, original map data including a plurality of original map data segments. In an implementation, each of the original map data segment may include a logical-physical mapping table such as a mapping table for logical to physical (L2P) mapping that maps logical addresses to corresponding physical addresses.

The host 300 sends a map data request to the map data processor 220. Upon receipt of the map data request, the map data processor 220 may generate a first mode signal. In another embodiment of the disclosed technology, the map data processor 220 may generate the first mode signal when a background operation is performed. In another embodiment of the disclosed technology, the map data processor 220 may generate the first mode signal based on a map data management policy regardless of a request of the host.

The map data processor 220 may provide the original map data and the first mode signal to the map data converter 230. The first mode signal may be a request message for generating first converted map data using the original map data. The first converted map data may include first converted map data segments, which are obtained by converting the original map data segments included in the original map data in response to the first mode signal. The first converted map data segment may include the physical address information included in each original map data segment and additional information pertaining to the physical address information.

The additional information may be used to determine whether the physical address information is valid. The additional information may also be used to indicate the frequency of access to the physical address information. The additional information may also include information related to generation of the physical address information. Whether the physical address information is valid may be determined based on whether the physical address information is the most recently updated information. The information related to generation of the physical address information may include a sequence in which the physical address information is generated.

The map data processor 220 may provide, to the host 300, the first converted map data obtained from the map data converter 230.

The map data converter 230 may generate first converted map data, which includes first converted map data segments, using the original map data segments in response to the first mode signal provided from the map data processor 220. The map data converter 230 may provide the first converted map data to the map data processor 220.

In an embodiment, the host 300 may include a host memory 310.

In order to receive the first converted map data, the host 300 sends a map data request to the memory controller 200. The host 300 may store, in the host memory 310, first converted map data obtained in response to the map data request. The host 300 may provide, along with a read request for data stored in the memory device 100, a logical address of the data to the memory controller 200. When providing the logical address to the memory controller 200, the host 300 may provide the first converted map data stored in the host memory 310, along with the logical address, to the memory controller 200. The memory controller 200 may control the memory device to read data corresponding to the read request using physical address information included in the first converted map data received from the host 300. The memory controller 200 may determine, using additional information related to the physical address information included in the first converted map data, whether the physical address information is valid and/or the frequency of access to the physical address information.

A map cache (not shown), which will be described with reference to FIG. 6B, may store a part of map data of the memory device 100. Map data stored in the map cache may be used to access the memory device 100. However, the capacity of the map cache is limited. Hence, map data information stored in the host memory 310 can be used to access the memory device 100. Such an efficient caching scheme of the host memory 310 of the host 300 can be referred to as "host performance boost (HPB)."

According to the HPB map data management scheme, the size of a map data segment, which is managed by the host 300, may differ from the size of a map data segment, which is managed by the memory controller 200 and the memory device 100. Therefore, in an embodiment, an original map data segment, which is managed by the memory controller 200 and the memory device 100, may be converted into a first converted map data segment, and the first converted map data segment may be used by the host 300 for mapping purposes.

Figure 6B:
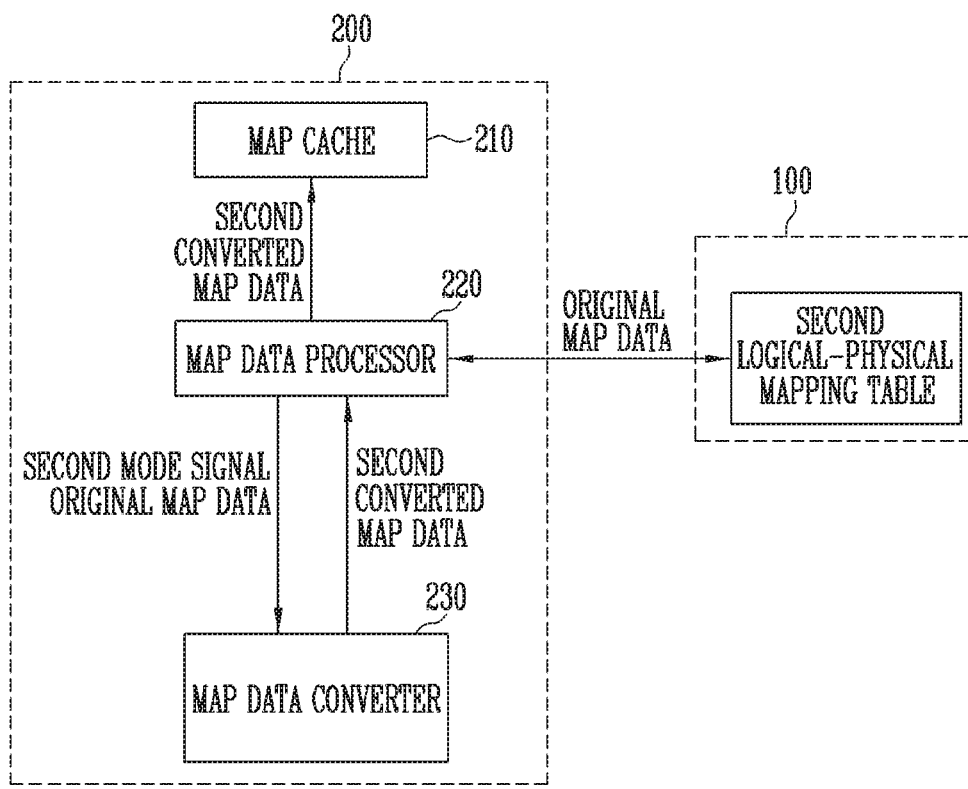
FIG. 6B illustrates an example operation of a memory controller based on an embodiment of the disclosed technology.

FIG. 6B illustrates an example operation of the memory controller 200 based on an embodiment of the disclosed technology.

Referring to FIG. 6B, the memory device 100 may include a second logical-physical mapping table.

Compared to the first logical-physical mapping table described with reference to FIG. 6A, each of the original map data segments stored in the second logical-physical mapping table may include both the physical address information indicating a physical address corresponding to a logical address of data and the additional information related to the physical address information.

Examples of the additional information may include information determining whether the physical address information is valid, information indicating the frequency of access to the physical address information, and information related to generation of the physical address information. The information indicating determining whether the physical address information is valid may be information indicating whether the physical address information is the most recently updated information. The information related to generation of the physical address information may include information about a sequence in which the physical address information is generated.

Referring to FIG. 6B, the memory controller 200 may include a map cache 210, a map data processor 220, and a map data converter 230. The map cache 210 may store a part of mapping information included in the second logical-physical mapping table stored in the memory device 100. Map data stored in the map cache 210 may be used to access the memory device 100.

The map data processor 220 may generate a second mode signal when the mapping information that is included in the second logical-physical mapping table and corresponds to the mapping information stored in the map cache 210 is updated. In various embodiments, the map data processor 220 may generate the second mode signal when a background operation is performed, or by a map data management policy regardless of whether the second logical-physical mapping table has been updated.

The map data processor 220 may provide the original map data segments and the second mode signal to the map data converter 230. The second mode signal may be a request message for generating second converted map data using the original map data. The second converted map data may include second converted map data segments obtained by converting the original map data segments included in the original map data in response to the second mode signal. The second converted map data segment is a part of the corresponding original map data segment. For example, the second converted map data segment may include physical address information included in the original map data segment. The second converted map data segment may not include additional information pertaining to the physical address information included in the original map data segment.

The map data processor 220 may update the map cache 210 using the second converted map data obtained from the map data converter 230. In detail, the map data processor 220 may add the second converted map data to the map cache 210, or convert the mapping information stored in the map cache 210 into second converted map data.

The map data converter 230 may generate second converted map data, which are divided into second converted map data segments, using the received original map data segments in response to the second mode signal provided from the map data processor 220. The map data converter 230 may provide the generated second converted map data to the map data processor 220.

According to the HPB map data management scheme described with reference to FIG. 6A, the size of a map data unit, which is managed by the host 300 and the memory device 100, may differ from the size of a map data unit, which is managed by the memory controller 200. Therefore, in an embodiment, an original map data chunk or segment, which is managed in the host 300 and the memory device 100, may be converted into a second converted map data segment, and the second converted map data segment may be used in the map cache 210 of the memory controller 200.

Figure 7:
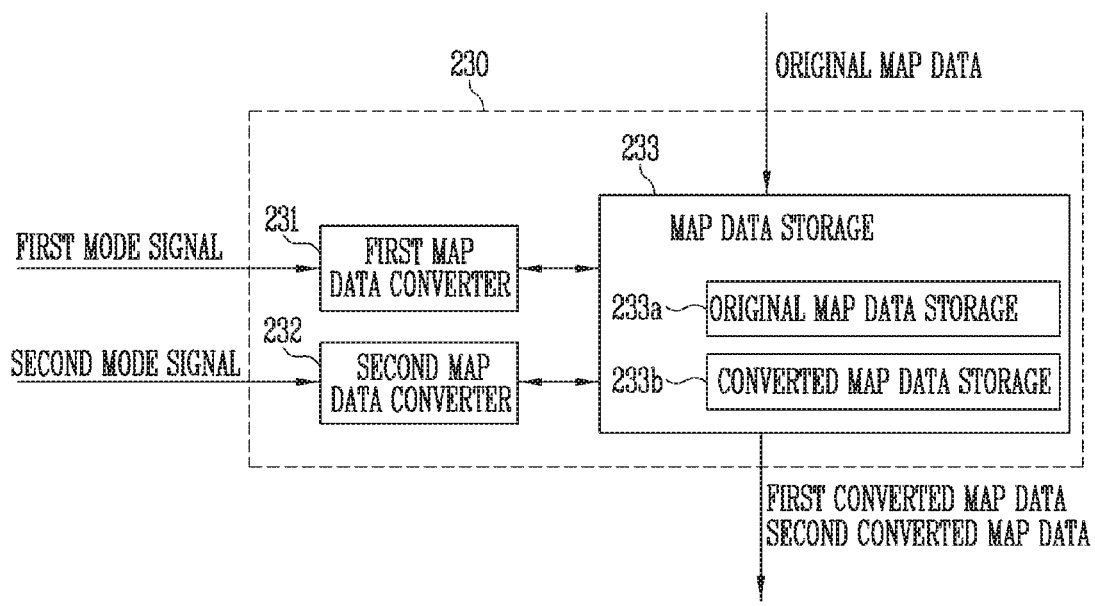
FIG. 7 is a diagram for describing a map data converter of FIGS. 6A and 6B.

FIG. 7 illustrates an example of the map data converter 230 of FIGS. 6A and 6B.

Referring to FIG. 7, the map data converter 230 may include a first map data converter 231, a second map data converter 232, and a map data storage 233.

The map data storage 233 may include an original map data storage 233a and a converted map data storage 233b.

The original map data storage 233a may include source storage areas corresponding to a plurality of respective source addresses. The original map data storage 233a may sequentially store, in the source storage areas, original map data segments received from the map data processor 220.

The converted map data storage 233b may include target storage areas corresponding to a plurality of respective target addresses.

In an embodiment, the converted map data storage 233b may store the entirety or part of each of the original map data segments received from the original map data storage 233a, in the target storage areas under control of the first map data converter 231.

For example, the converted map data storage 233b may store the original map data segments in the target storage areas under control of the first map data converter 231. The data segments that are stored in the respective target storage areas may be first converted map data segments. Each of the first converted map data segments may further include separate additional information, in addition to the corresponding original map data segment. The converted map data storage 233b may provide the first converted map data, which is divided into the first converted map data segments, to the map data processor 220.

In an embodiment, the converted map data storage 233b may store a part of each of the original map data segments received from the original map data storage 233a, in the target storage areas under control of the second map data converter 232.

For example, the converted map data storage 233b may store the entirety or part of each of the original map data segments as a second converted map data segment, under control of the second map data converter 232. Each of the second converted map data segments may be a part of the corresponding original map data segment. The converted map data storage 233b may provide the second converted map data, which is divided into the second converted map data segments, to the map data processor 220.

The map data converter 230 may include the first map data converter 231 and the second map data converter 232. The first map data converter 231 may control the original map data storage 233a and the converted map data storage 233b, in response to a first mode signal received from the map data processor 220.

The first map data converter 231 may store the original map data segments that are sequentially stored in the source storage areas of the original map data storage 233a to the target storage areas respectively corresponding to the plurality of target addresses of the converted map data storage 233b.

For example, the first map data converter 231 may store, in a first target storage area, an original map data segment that is stored in a first source storage area among the original map data segments.

If the original map data stored in the first source storage area is stored in the first target storage area, the first map data converter 231 may store, in a second target storage area, an original map data segment that is stored in a second source storage area.

The first source storage area may be a storage area corresponding to a first source address among the plurality of source addresses. The second source storage area may be a storage area corresponding to a second source address among the plurality of source addresses. The source addresses that correspond to the source storage areas included in the original map data storage 233a may increase at regular source address offset intervals. Therefore, there is an interval corresponding to a source address offset between the first source address and the second source address. Thus, the first source storage area may have a size corresponding to a source address offset value.

The first target storage area may be a storage area corresponding to a first target address among the plurality of target addresses. The second target storage area may be a storage area corresponding to a second target address among the plurality of target addresses. The second target address may be an address obtained by adding a predetermined offset to the first target address. Since the first target address and the second target address have therebetween an interval corresponding to a predetermined offset, the first target storage area may have a size corresponding to a predetermined offset value.

In an embodiment, the predetermined offset may have a value different from that of the source address offset. Therefore, the predetermined offset may be greater or less than the source address offset. If the predetermined offset is less than the source address offset, the size of the first target storage area may be less than the size of the first source storage area. If the predetermined offset is greater than the source address offset, the size of the first target storage area may be greater than the size of the first source storage area.

The second map data converter 232 may control the original map data storage 233a and the converted map data storage 233b, in response to a second mode signal received from the map data processor 220.

In detail, the second map data converter 232 may convert the original map data segments which are stored in the original map data storage 233a and each of which has a first data size into converted map data segments each having a second data size less than the first data size, and store the converted map data segments in the converted map data storage 233b. The second map data converter 232 may convert an original map data segment into a converted map data segment in such a way that a part of the original map data segment is stored as the converted map data segment.

Figure 8:
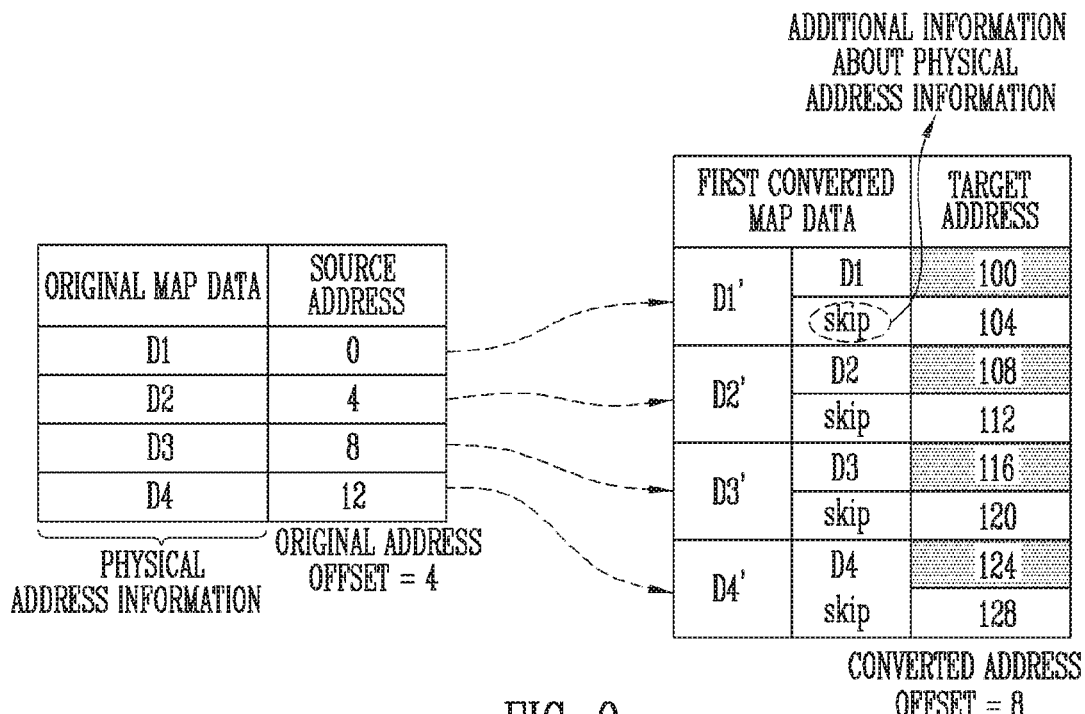
FIG. 8 illustrates an example operation of a first map data converter of FIG. 7.

FIG. 8 illustrates an example operation of the first map data converter of FIG. 7.

Referring to FIG. 8, the source storage areas may correspond to source addresses. The source addresses shown in the table of FIG. 8 may indicate start positions of the respective source storage areas. The source addresses may increase by a source address offset. The source address offset (original address offset) may be 4. The source address offset may be an offset between the source addresses. The source address may be an original address in which original data is stored.

An original map data segment D1 may be stored in a first source storage area corresponding to source address 0 to 3. An original map data segment D2 may be stored in a second source storage area corresponding to source address 4 to 7. An original map data segment D3 may be stored in a third source storage area corresponding to source address 8 to 11. An original map data segment D4 may be stored in a fourth source storage area corresponding to source address 12 to 15. Each of the original map data segments D1 to D4 may include physical address information described with reference to FIG. 6A. The values of the source addresses, the source address offset, and the number of original map data segments are not limited to those of this embodiment.

Target storage areas may correspond to target addresses. The target addresses shown in the table of FIG. 8 may indicate start positions of the respective target storage areas. An offset between the target addresses is a predetermined value, and may be 8. The predetermined offset may be a converted address offset. Converted addresses are addresses in which converted data is stored. The converted addresses may be the target addresses.

Therefore, a first target storage area may correspond to target address 100 to 107. A second target storage area may correspond to target address 108 to 115. A third target storage area may correspond to target address 116 to 123. A fourth target storage area may correspond to target address 124 to 131.

The first map data converter described with reference to FIG. 7 may be activated in response to the first mode signal. The size of a storage area corresponding to a source address having an identical address offset may be the same as the size of a storage area corresponding to a target address having an identical address offset. For example, the size of the source storage area corresponding to source address 0 to 3 may be the same as the size of the target storage area corresponding to target address 100 to 103.

Referring to FIG. 7, the first map data converter may control the conversion operation such that the original map data segments D1 to D4 that are sequentially stored in the source storage areas may be stored to the first to fourth target storage areas.

For example, the original map data segment D1 may be stored in a storage area of the first target storage area that corresponds to target address 100 to 103. The original map data segment D2 may be stored in a storage area of the second target storage area that corresponds to target address 108 to 111. The original map data segment D3 may be stored in a storage area of the third target storage area that corresponds to target address 116 to 119. The original map data segment D4 may be stored in a storage area of the fourth target storage area that corresponds to target address 124 to 127.

A "skip" area may be empty space in which no original map data segment is stored. Separate additional information may be stored in the skip area. For instance, the additional information may include information related to physical address information stored in the corresponding original data segment. Examples of the information related to the physical address information may include information determining whether the physical address information is valid, information indicating the frequency of access to the physical address information, and information related to generation of the physical address information. The information indicating determining whether the physical address information is valid may be information indicating whether the physical address information is the most recently updated information. The information related to generation of the physical address information may include information about a sequence in which the physical address information is generated. Alternatively, dummy data may be stored in the skip area.

Referring to FIG. 8, a storage area of the first target storage area that corresponds to target address 104 to 107 may be a skip area. A storage area of the second target storage area that corresponds to target address 112 to 115 may be a skip area. A storage area of the third target storage area that corresponds to target address 120 to 123 may be a skip area. A storage area of the fourth target storage area that corresponds to target address 128 to 131 may be a skip area.

Therefore, each of the first converted map data segments D1' to D4' that are respectively stored in the first to fourth target storage areas may not only include the physical address information included in the corresponding original map data segment but also include separate additional information stored in the corresponding skip area.

The number of first converted map data segments and the number of target addresses are not limited to those of this embodiment.

Figure 9:
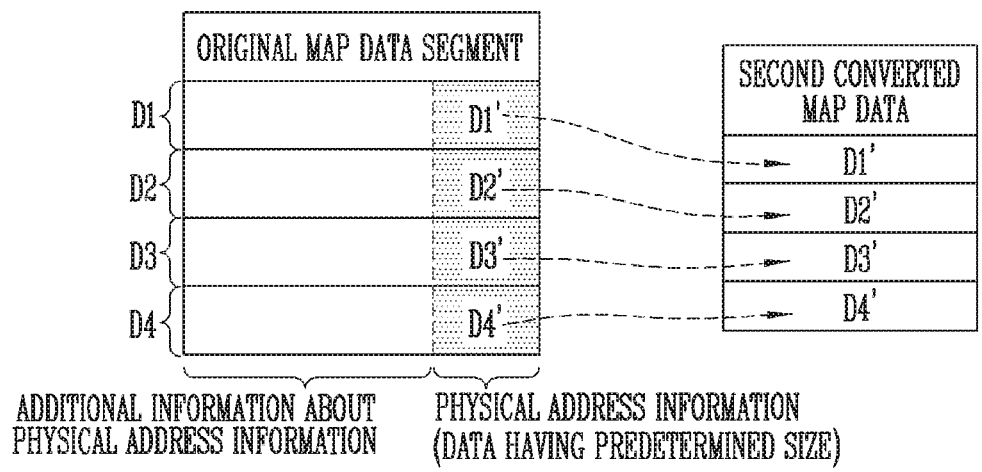
FIG. 9 illustrates an example operation of a second map data converter of FIG. 7.

FIG. 9 illustrates an example operation of the second map data converter of FIG. 7.

Referring to FIG. 9, each of the original map data segments may have a first data size, and each of the second converted map data segments may have a second data size. The second data size may be less than the first data size.

The second map data converter described with reference to FIG. 7 may be activated in response to the second mode signal. Under control of the second map data converter, a part of each of the original map data segment may be stored as a converted map data segment. For example, each original map data segment having the first data size may be stored as a second converted map data segment having the second data size.

Each of the original map data segments D1 to D4 may include both the physical address information and the additional information related to the physical address information. Examples of the additional information may include information determining whether the physical address information is valid, information indicating the frequency of access to the physical address information, and information related to generation of the physical address information. The information indicating determining whether the physical address information is valid may be information indicating whether the physical address information is most-recently updated information. The information related to generation of the physical address information may include a sequence in which the physical address information is generated.

Each of the second converted map data segments D1' to D4' may be a part of a corresponding one of the original map data segments D1 to D4 and include physical address information.

Figure 10:
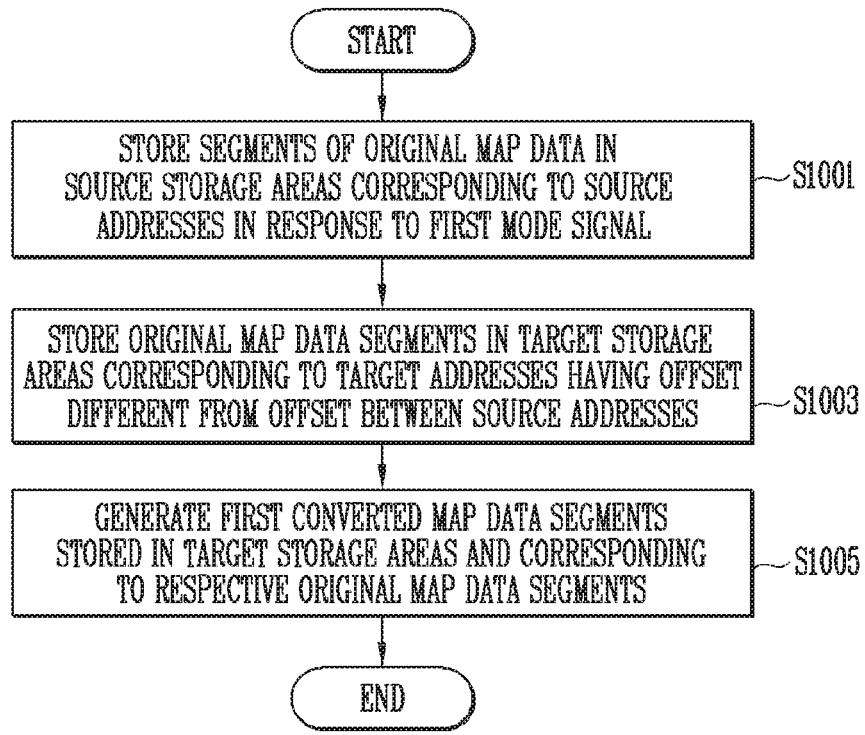
FIG. 10 is a flowchart illustrating an operation of the memory controller based on an embodiment of the disclosed technology.

FIG. 10 is a flowchart illustrating an operation of the memory controller based on an embodiment of the disclosed technology.

Referring to FIG. 10, at step S1001, the memory controller may store original map data segments in source storage areas corresponding to respective source addresses, in response to a first mode signal.

At step S1003, the memory controller may store the original map data segments in target storage areas that respectively correspond to target addresses with an offset therebetween different from an offset between the source addresses.

At step S1005, the memory controller may generate first converted map data segments that are stored in the target storage areas and correspond to the respective original map data segments.

Figure 11:
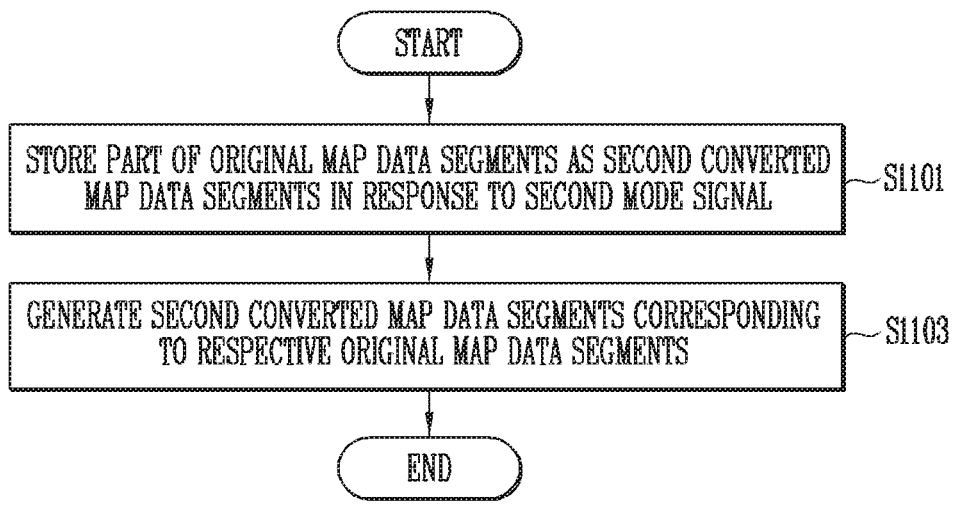
FIG. 11 is a flowchart illustrating an operation of the memory controller based on an embodiment of the disclosed technology.

FIG. 11 is a flowchart illustrating an operation of the memory controller based on an embodiment of the disclosed technology.

Referring to FIG. 11, at step S1101, the memory controller may store a part of each of the original map data segments as a corresponding one of second converted map data segments, in response to a second mode signal.

At step S1103, the memory controller may generate second converted map data segments corresponding to the respective original map data segments.

Figure 12:
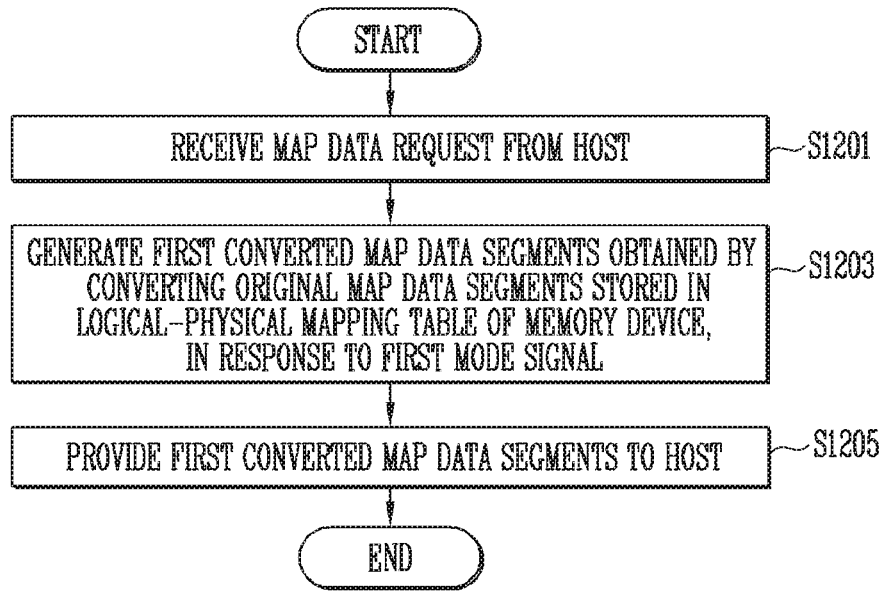
FIG. 12 is a flowchart for describing an operation of the memory controller based on an embodiment of the disclosed technology.

FIG. 12 is a flowchart for describing an operation of the memory controller based on an embodiment of the disclosed technology.

Referring to FIG. 12, at step 1201, the memory controller may receive a map data request from the host.

At step S1203, the memory controller may generate first converted map data segments obtained by converting original map data segments stored in the logical-physical mapping table of the memory device in response to a first mode signal.

At step S1205, the memory controller may provide the first converted map data segments to the host.

Figure 13:
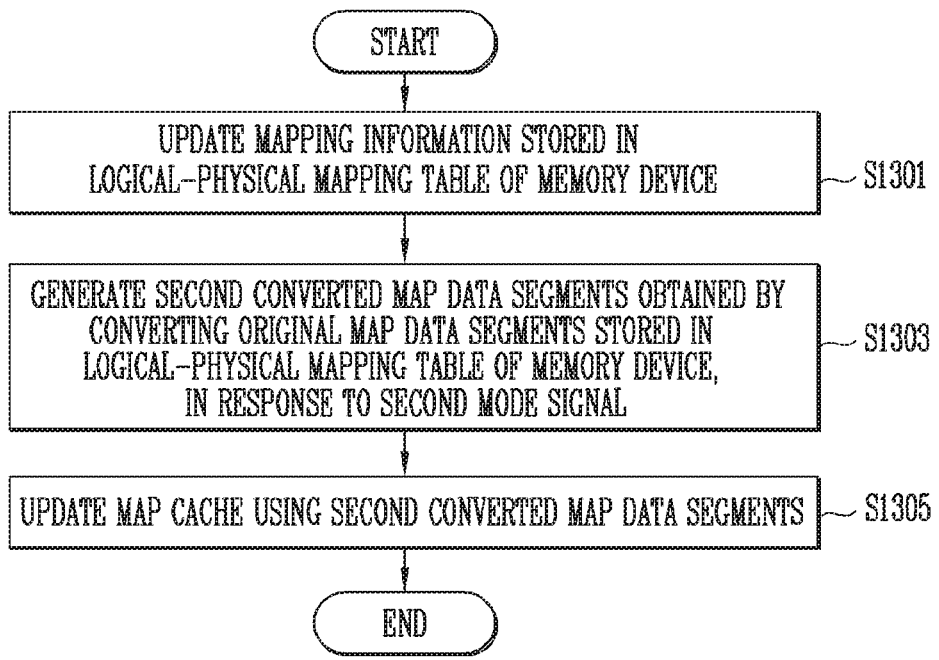
FIG. 13 is a flowchart illustrating an operation of the memory controller based on an embodiment of the disclosed technology.

FIG. 13 is a flowchart illustrating an operation of the memory controller based on an embodiment of the disclosed technology.

Referring to FIG. 13, at step S1301, the memory controller may update mapping information included in the logical-physical mapping table of the memory device. In various embodiments, if the mapping information included in the mapping table is updated, a second mode signal may be generated.

At step S1303, the memory controller may generate second converted map data segments obtained by converting the original map data segments stored in the logical-physical mapping table of the memory device in response to the second mode signal.

At step S1305, the memory controller may update the map cache using the second converted map data segments.

The technology disclosed in this patent document can be implemented in embodiments to provide a storage device that can perform a mapping information conversion to convert mapping formats. In some implementations, there is a memory mapping unit between a processor and a memory device to translate an address in a processor format into an address in a memory format. The processor format can be different from the memory format. Thus, it is necessary to accommodate different formats.

For the fast address translation, the FTL can employ caches to store the mapping data such as logical-to-physical mapping to speed up the page and/or block level address translations. For example, mapping information stored in a map cache of the memory device can be stored to a host side cache. The segment size of the mapping information at the map cache of the memory device, however, may differ from the segment size of the mapping information at the host side cache.

In an embodiment of the disclosed technology, the address format is converted from the professor format to the device format, or vice versa. For example, in a scenario where the segment size of the mapping information at the map cache of the memory device is 4 bytes and the segment size of the mapping information at the host side cache is 8 bytes, the mapping information of 8 bytes can be converted to a 4-byte format when the FTL fetches the mapping information from the memory device. In an implementation, additional information of 4 bytes can be added to the mapping information of 4 bytes to accommodate the 8 bytes mapping information format.

In another embodiment of the disclosed technology, the address fetching is skipped for the difference between the segment size of the mapping information at the map cache of the memory device and the segment size of the mapping information at the host side cache. In a scenario where the segment size of the mapping information at the map cache of the memory device is 4 bytes and the segment size of the mapping information at the host side cache is 8 bytes, 4 bytes are skipped after each fetching of the mapping information of 4 bytes.

In an embodiment of the disclosed technology, a storage device includes a memory device including a map cache to store cache segments for logical-to-physical mapping, a memory mapping circuit configured to translate cache segments from one format to another format, and a memory interface configured to access the memory device based on the translated cache segments. The translation of the cache segments by the memory mapping circuit includes adding additional information to the cache segment of the one format to match the other format. The translation of the cache segments by the memory mapping circuit includes skipping a predetermined number of bytes of data segments such that a sum of the predetermined number of bytes of data segments and a number of bytes of the data segment of the one format matches a number of bytes of the data segment of the other format.

Figure 14:
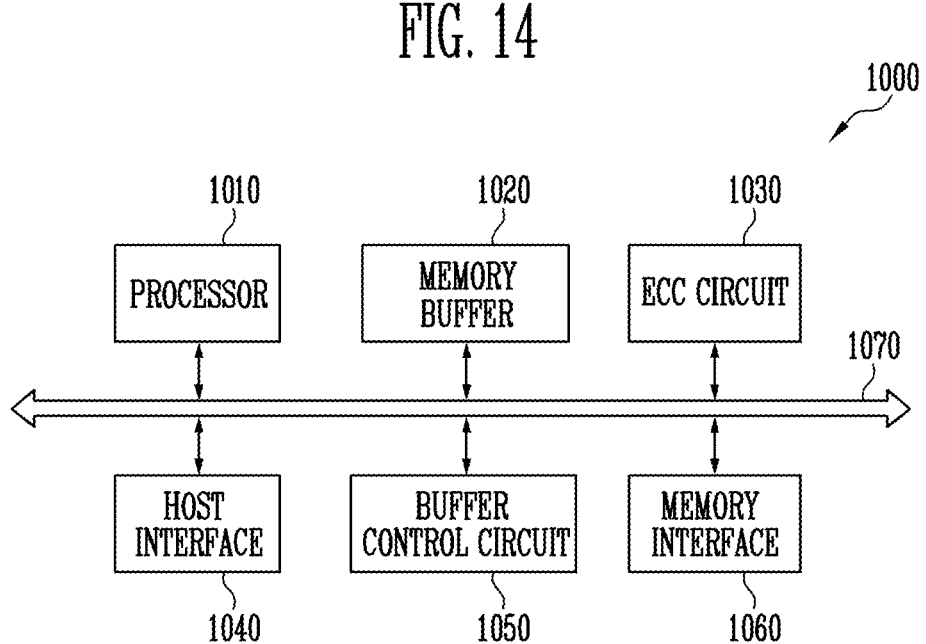
FIG. 14 is a diagram illustrating an example of the memory controller of FIG. 1 based on an embodiment of the disclosed technology.

FIG. 14 is a diagram illustrating an example of the memory controller of FIG. 1 based on an embodiment of the disclosed technology.

Referring to FIG. 14, a memory controller 1000 is coupled to a host and a memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host Interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040, and communicate with the memory device through the memory interface 1060. In addition, the processor 1010 may communicate with the memory buffer 1020 through the buffer control circuit 1050. The processor 1010 may control the operation of the storage device by using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. An address mapping method using the FTL may be modified in various ways depending on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device as data to be stored, and may be programmed to the memory cell array.

During a read operation, the processor 1010 may derandomize data received from the memory device 100. For example, the processor 1010 may use a derandomizing seed to derandomize data received from the memory device. Derandomized data may be output to the host.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device through the channel.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 15:
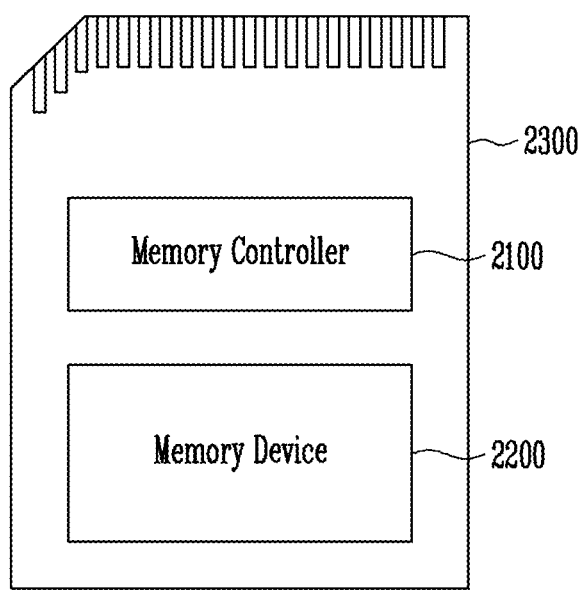
FIG. 15 is a block diagram illustrating a memory card system including the storage device implemented based on an embodiment of the disclosed technology.

FIG. 15 is a block diagram illustrating a memory card system 2000 including the storage device implemented based on an embodiment of the disclosed technology.

Referring FIG. 15, the memory card system 2000 may include a memory controller 2100, a memory device 2200 and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2100 and the host. The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as a random access memory (RAM), a processor, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick, a multimedia card (MMC, RS-MMC, or MMCmicro), a SD card (SD, mini SD, microSD, or SDHC), or a universal flash storage (UFS).

Figure 16:
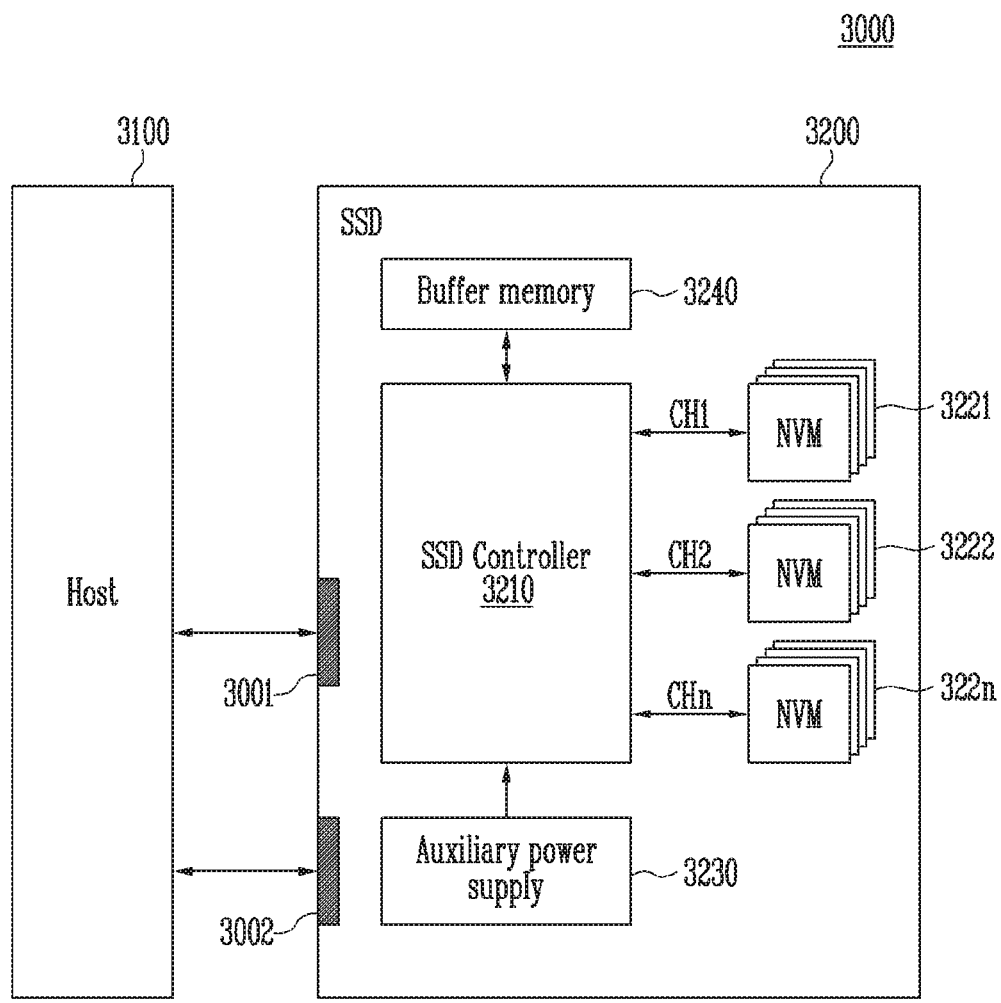
FIG. 16 is a block diagram illustrating a solid state drive (SSD) system including the storage device implemented based on an embodiment of the disclosed technology.

FIG. 16 is a block diagram illustrating a solid state drive (SSD) system 3000 including the storage device implemented based on an embodiment of the disclosed technology.

Referring to FIG. 16, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as an FRAM, a ReRAM, an STT-MRAM, and a PRAM.

Figure 17:
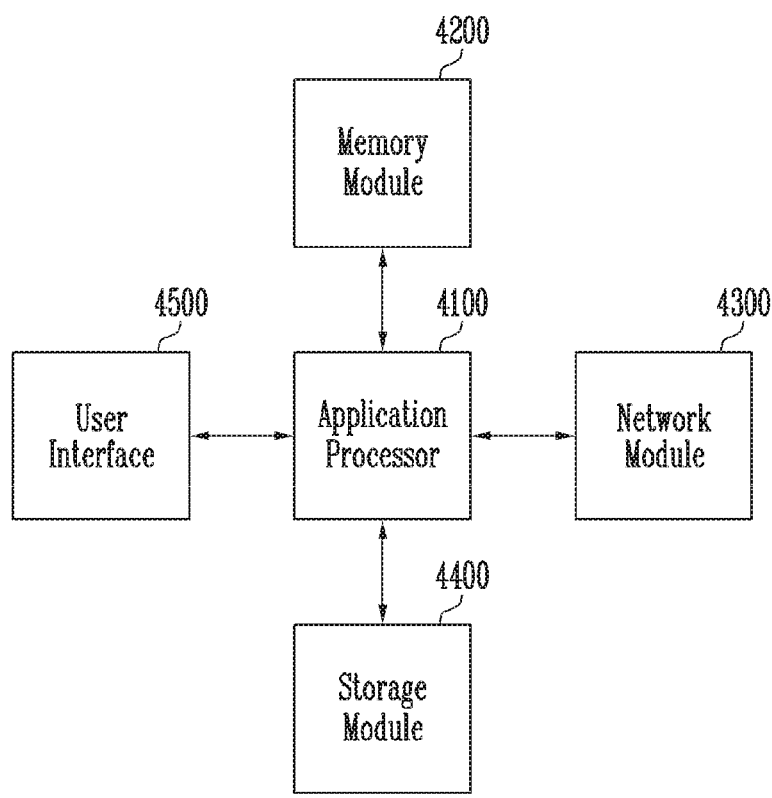
FIG. 17 is a block diagram illustrating a user system including the storage device implemented based on an embodiment of the disclosed technology.

FIG. 17 is a block diagram illustrating a user system 4000 including the storage device implemented based on an embodiment of the disclosed technology.

Referring to FIG. 17, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDRAM, an LPDDR2 SDRAM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIG. 1. The storage module 4400 may be operated in the same manner as that of the storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a liquid crystal display (LCD), an organic light emitting diode (OLED) display device, an active matrix OLED (AMOLED) display device, an LED, a speaker, and a motor.

What is claimed is:

1. A memory controller comprising:
   a map data processor configured to receive original map data segments from a memory device and generate a mode signal;
   an original map data storage in communication with the map data processor and configured to sequentially store the original map data segments in source storage areas that respectively correspond to a plurality of source addresses;
   a converted map data storage in communication with the map data processor and configured to store the original map data segments in target storage areas that respectively correspond to a plurality of target addresses; and
   a map data converter in communication with the map data processor and configured to control the converted map data storage such that, in response to the mode signal, when any one original map data segment of the original map data segments is stored in a first target storage area corresponding to a first target address of the plurality of target addresses, an original map data segment subsequent to the any one original map data segment is stored in a second target storage area that corresponds to a second target address obtained by adding a predetermined offset to the first target address.

2. The memory controller according to claim 1, wherein the map data processor generates the mode signal when a map data request is received from a host.

3. The memory controller according to claim 2,
   wherein the first target storage area stores a converted map data segment corresponding to the any one original map data segment, and
   wherein the converted map data segment is provided to the host in response to the map data request and stored in a memory area of the host.

4. The memory controller according to claim 3, wherein the any one original map data segment includes a physical address information indicating a physical address of the memory device in which data is stored, corresponding to a logical address of the data provided from the host.

5. The memory controller according to claim 4, wherein the converted map data segment includes the physical address information, and further includes at least one of information determining whether the physical address information is valid, information indicating a frequency of access to the physical address information, and information related to generation of the physical address information.

6. The memory controller according to claim 1, wherein the plurality of source addresses increases at an offset interval different from an interval of the predetermined offset.

7. The memory controller according to claim 5, wherein a size of the first target storage area is greater than a size of a source storage area in which the any one original map data segment is stored.

8. The memory controller according to claim 1, wherein the map data processor generates the mode signal when a background operation that is an internal operation which is performed regardless of a request of a host is performed.

9. A memory controller comprising:
   a map data processor configured to receive an original map data segment from a memory device, and generate a mode signal for requesting to generate a converted map data segment obtained by converting the original map data segment;
   an original map data storage in communication with the map data processor and configured to store the original map data segment having a first data size;
   a converted map data storage in communication with the map data processor and configured to store the converted map data segment having a second data size different from the first data size; and
   a map data converter in communication with the map data processor and configured to control the converted map data storage to store a part of the original map data segment as the converted map data segment in response to the mode signal.

10. The memory controller according to claim 9,
    wherein the map data processor provides the original map data segment to a host in response to a map data request provided from the host, and
    wherein the original map data segment is stored in a memory area of the host.

11. The memory controller according to claim 10, wherein the original map data segment includes physical address information indicating a physical address of the memory device which corresponds to a logical address of data provided from the host, and in which the data is stored, the original map data segment further including at least one of information determining whether the physical address information is valid, information indicating a frequency of access to the physical address information, and information related to generation of the physical address information.

12. The memory controller according to claim 11, wherein the converted map data segment includes the physical address information.

13. A storage device comprising:
    a memory device configured to store a logical-physical mapping table indicating a mapping relationship between a logical address of data provided from a host and a physical address of the memory device in which the data is stored; and
    a memory controller configured to receive original map data segments included in the logical-physical mapping table from the memory device, generate a mode signal for requesting to generate converted map data segments obtained by converting the original map data segments, sequentially store, in response to the mode signal, the original map data segments in source storage areas that respectively correspond to a plurality of source addresses, and store, when a selected original map data segment of the original map data segments is stored in a target storage area corresponding to a first target address of a plurality of target addresses, an original map data segment subsequent to the selected original map data segment in a target storage area corresponding to a second target address, wherein the second target address is obtained by adding a predetermined offset to the first target address among the plurality of target addresses, and wherein the plurality of source addresses increase at an offset interval different from an interval of the predetermined offset.

14. The storage device according to claim 13, wherein the target storage area corresponding to the first target address stores a converted map data segment corresponding to the selected original map data segment.

15. The storage device according to claim 14, wherein, when a map data request is received from the host, the memory controller generates the mode signal, and provides the generated converted map data segment to the host in response to the mode signal, and wherein the converted map data segment is stored in a memory area of the host.

16. The storage device according to claim 15, wherein the selected original map data segment includes physical address information indicating the physical address corresponding to the logical address, and wherein the converted map data segment includes the physical address information, and further includes at least one of information determining whether the physical address information is valid, information indicating a frequency of access to the physical address information, and information related to generation of the physical address information.

17. A storage device comprising:

a memory device configured to store a logical-physical mapping table indicating a mapping relationship between a logical address of data provided from a host and a physical address of the memory device in which the data is stored; and a memory controller configured to receive an original map data segment included in the logical-physical mapping table from the memory device, generate a mode signal for requesting to generate a converted map data segment obtained by converting the original map data segment, store a part of the original map data segment as the converted map data segment in response to the mode signal, wherein the original map data segment has a first data size, and wherein the converted map data segment has a second data size different from the first data size.

18. The storage device according to claim 17, wherein the memory controller provides the original map data segment to the host in response to a map data request provided from the host, and wherein the original map data segment is stored in a memory area of the host.

19. The storage device according to claim 17, wherein the original map data segment includes physical address information indicating the physical address corresponding to the logical address, and further includes at least one of information determining whether the physical address information is valid, information indicating a frequency of access to the physical address information, and information related to generation of the physical address information, and wherein the converted map data segment includes the physical address information.

20. The storage device according to claim 19, wherein the memory controller further includes a map cache configured to store some of mapping information included in the logical-physical mapping table, updates the map cache using the converted map data segment generated in response to the mode signal.

* * * * *